US011054728B1

(12) United States Patent
Ollila et al.

(10) Patent No.: US 11,054,728 B1
(45) Date of Patent: Jul. 6, 2021

(54) IMAGING SYSTEM AND METHOD USING PROJECTION APPARATUS

(71) Applicant: Varjo Technologies Oy, Helsinki (FI)

(72) Inventors: Mikko Ollila, Tampere (FI); Klaus Melakari, Oulu (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/836,046

(22) Filed: Mar. 31, 2020

(51) Int. Cl.
*G03B 21/20* (2006.01)
*G02F 1/1333* (2006.01)
*G02F 1/135* (2006.01)
*G02F 1/1335* (2006.01)

(52) U.S. Cl.
CPC ... *G03B 21/2006* (2013.01); *G02F 1/133365* (2013.01); *G02F 1/1351* (2021.01); *G02F 1/1355* (2021.01); *G02F 1/133627* (2021.01)

(58) Field of Classification Search
CPC .......... G02F 1/29; G02F 1/292; G02F 1/1326; G02F 1/1351; G02F 1/1355; G02F 1/1334; G02F 1/13306; G02F 1/13318; G02F 1/13336; G02F 1/13365; G02F 1/133504; G02F 1/133627; G02F 1/13439; G02F 1/13471; G03B 21/006; G03B 21/145; G03B 21/208; G03B 21/2006; G03B 21/2013; G03B 21/2033
See application file for complete search history.

(56) References Cited

U.S. PATENT DOCUMENTS

| 10,901,310 B2 * | 1/2021 | Ma | G02B 27/0977 |
| 2019/0258134 A1 * | 8/2019 | Chen | G01B 11/2513 |
| 2019/0364251 A1 * | 11/2019 | Tsubota | H04N 9/3147 |

* cited by examiner

*Primary Examiner* — Sultan Chowdhury
(74) *Attorney, Agent, or Firm* — Ziegler IP Law Group, LLC

(57) ABSTRACT

A projection apparatus including an array of infrared emitters, the infrared emitters of said array being arranged in a first pattern; a plurality of liquid-crystal cells and corresponding control circuits, a given liquid-crystal cell being arranged in front of a corresponding infrared emitter of said array; and a processor configured to generate drive signals for driving the control circuits in a random or pseudorandom manner; and control the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of: block light emanating from a corresponding infrared emitter, transmit the light in an unbended manner, bend the light.

20 Claims, 9 Drawing Sheets

IMAGING SYSTEM AND METHOD USING PROJECTION APPARATUS

TECHNICAL FIELD

The present disclosure relates generally to projection apparatuses for imaging systems; and more specifically, to projection apparatuses comprising arrays of infrared emitters, liquid-crystal cells and corresponding control circuits, and processors. Moreover, the present disclosure also relates to imaging systems comprising cameras, projection apparatuses, and processors. Furthermore, the present disclosure also relates to methods of imaging, via the aforesaid imaging systems.

BACKGROUND

Nowadays, projection devices are increasingly being employed for various purposes, such as navigation, extended-reality applications, surveillance, and the like. A conventional projection device employs an illumination source for illuminating a given environment. Often, in such a case, the illumination source is implemented by multiple light emitters that project a pattern of light spots onto objects in the given environment.

In conventional projection devices, the multiple light emitters are arranged in either a regular pattern or an irregular (namely, random or pseudorandom) pattern. Correspondingly, the projected pattern of light spots is either a regular pattern or an irregular pattern. However, the conventional projection devices are capable of generating only a pattern (of light spots) that corresponds to the arrangement of the multiple light emitters. Moreover, when such projection devices are employed in imaging equipment that captures images of reflections of the projected pattern of light spots from the objects in the given environment, the imaging equipment has limited applicability for various purposes (for example, such as depth sensing, texture determination, and the like).

Therefore, in light of the foregoing discussion, there exists a need to overcome the aforementioned drawbacks associated with conventional projection devices.

SUMMARY

The present disclosure seeks to provide a projection apparatus. The present disclosure also seeks to provide an imaging system. The present disclosure also seeks to provide a method of imaging, via an imaging system. The present disclosure seeks to provide a solution to the existing problem of a conventional projection device being capable of generating only a pattern (of light spots) that corresponds to an arrangement of multiple light emitters in said projection device. An aim of the present disclosure is to provide a solution that overcomes at least partially the problems encountered in prior art, and provides a projection apparatus that supports projection a pattern (of light spots) that is different from an arrangement of infrared emitters.

In one aspect, an embodiment of the present disclosure provides a projection apparatus comprising:
an array of infrared emitters, the infrared emitters of said array being arranged in a first pattern;
a plurality of liquid-crystal cells and corresponding control circuits, a given liquid-crystal cell being arranged in front of a corresponding infrared emitter of said array; and
a processor configured to:
generate drive signals for driving the control circuits in a random or pseudorandom manner; and
control the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
block light emanating from a corresponding infrared emitter,
transmit the light in an unbended manner,
bend the light.

In another aspect, an embodiment of the present disclosure provides an imaging system comprising:
at least one camera;
a projection apparatus comprising:
an array of infrared emitters, the infrared emitters of said array being arranged in a first pattern; and
a plurality of liquid-crystal cells and corresponding control circuits, a given liquid-crystal cell being arranged in front of a corresponding infrared emitter of said array; and
a processor configured to:
generate drive signals for driving the control circuits in a random or pseudorandom manner;
control the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
block light emanating from a corresponding infrared emitter,
transmit the light in an unbended manner,
bend the light;
control the at least one camera to capture an image of reflections of the light spots from surfaces of the objects; and
process the captured image to gather information pertaining to at least one of: an optical depth of a given object, a texture of a given surface of the given object, a shape of the given surface, a material of the given surface.

In yet another aspect, an embodiment of the present disclosure provides a method of imaging, via an imaging system comprising at least one camera and a projection apparatus comprising an array of infrared emitters arranged in a first pattern, a plurality of liquid-crystal cells and corresponding control circuits, wherein a given liquid-crystal cell is arranged in front of a corresponding infrared emitter of said array, the method comprising:
generating drive signals for driving the control circuits in a random or pseudorandom manner;
controlling the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
block light emanating from a corresponding infrared emitter,
transmit the light in an unbended manner,
bend the light;
capturing, via the at least one camera, an image of reflections of the light spots from surfaces of the objects; and
processing the captured image to gather information pertaining to at least one of: an optical depth of a given object, a texture of a given surface of the given object, a shape of the given surface, a material of the given surface.

Embodiments of the present disclosure substantially eliminate or at least partially address the aforementioned problems in the prior art, and enable a projection apparatus to project patterns that are different from an arrangement of infrared emitters.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
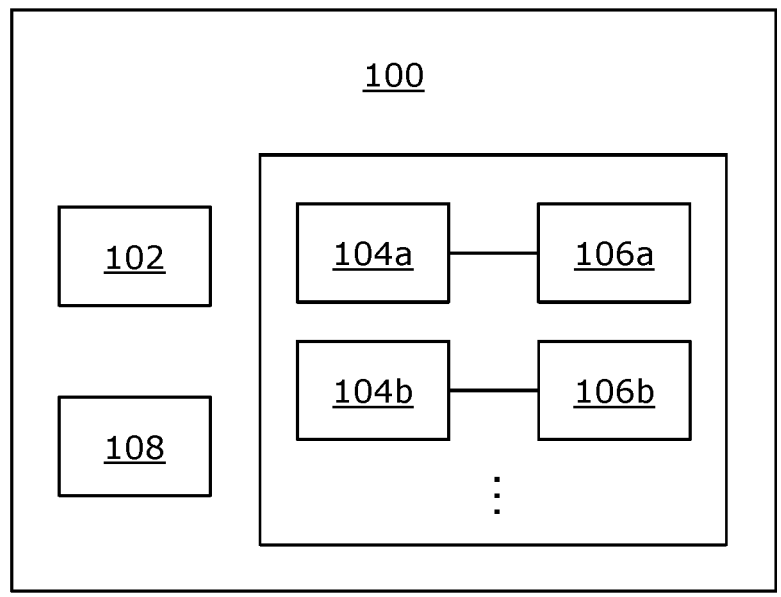
FIGS. 1 and 2 illustrate block diagrams of architectures of a projection apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a projection apparatus comprising:
  an array of infrared emitters, the infrared emitters of said array being arranged in a first pattern;
  a plurality of liquid-crystal cells and corresponding control circuits, a given liquid-crystal cell being arranged in front of a corresponding infrared emitter of said array; and
  a processor configured to:
    generate drive signals for driving the control circuits in a random or pseudorandom manner; and
    control the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
    block light emanating from a corresponding infrared emitter,
    transmit the light in an unbended manner,
    bend the light.

In another aspect, an embodiment of the present disclosure provides an imaging system comprising:
  at least one camera;
  a projection apparatus comprising:
    an array of infrared emitters, the infrared emitters of said array being arranged in a first pattern; and
    a plurality of liquid-crystal cells and corresponding control circuits, a given liquid-crystal cell being arranged in front of a corresponding infrared emitter of said array; and
    a processor configured to:
      generate drive signals for driving the control circuits in a random or pseudorandom manner;
      control the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
      block light emanating from a corresponding infrared emitter,
      transmit the light in an unbended manner,
      bend the light;
      control the at least one camera to capture an image of reflections of the light spots from surfaces of the objects; and
      process the captured image to gather information pertaining to at least one of: an optical depth of a given object, a texture of a given surface of the given object, a shape of the given surface, a material of the given surface.

In yet another aspect, an embodiment of the present disclosure provides a method of imaging, via an imaging system comprising at least one camera and a projection apparatus comprising an array of infrared emitters arranged in a first pattern, a plurality of liquid-crystal cells and corresponding control circuits, wherein a given liquid-crystal cell is arranged in front of a corresponding infrared emitter of said array, the method comprising:
  generating drive signals for driving the control circuits in a random or pseudorandom manner;
  controlling the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
 block light emanating from a corresponding infrared emitter,
 transmit the light in an unbended manner,
 bend the light;
 capturing, via the at least one camera, an image of reflections of the light spots from surfaces of the objects; and
 processing the captured image to gather information pertaining to at least one of: an optical depth of a given object, a texture of a given surface of the given object, a shape of the given surface, a material of the given surface.

The present disclosure provides the aforementioned projection apparatus, the aforementioned imaging system, and the aforementioned method of imaging, via the imaging system. The projection apparatus supports projection of the second pattern of light spots from the infrared emitters that are arranged in the first pattern, the first pattern being different from the second pattern. The imaging system that employs such a projection apparatus has versatile functionality and applicability for various purposes (for example, such as depth sensing, shape determination, texture determination, material identification, and the like).

Throughout the present disclosure, the term "projection apparatus" refers to specialized equipment for projecting a required illumination pattern onto the objects present in the real-world environment. The illumination pattern is dynamically controllable, as required. Notably, the projection apparatus projects the second pattern of light spots onto the objects present in the real-world environment.

It will be appreciated that the "second pattern of light spots" refers to structured light that is emitted onto the objects present in the real-world environment in a predefined pattern, such as a matrix or a grid. The second pattern of light spots is produced by individually controlling the plurality of liquid-crystal cells to correspond to the predefined pattern. The predefined pattern is a linear pattern, a circular pattern, a triangular pattern, a rectangular pattern, a concentric circular pattern (such as, circles having decreasing or increasing diameters with respect to each other and having a common center), a text pattern, a symbol pattern, a design pattern, and the like.

Optionally, a shape of a given light spot in the second pattern is one of: a circle, an ellipse, a polygon, or a freeform shape (for example, such as, a shape of an alphabet, a number, a symbol, a design, and the like).

Throughout the present disclosure, the term "infrared emitter" refers to equipment that, in operation, emits infrared light. The projection apparatus includes a plurality of infrared emitters that emit a plurality of rays of infrared light. In other words, the plurality of rays of infrared light emanate from the plurality of infrared emitters. Throughout the present disclosure, the term "light" has been used to refer to "infrared light", for sake of convenience only.

The plurality of infrared emitters are arranged in form of an array. Notably, the first pattern in which the infrared emitters of said array are arranged is a two-dimensional pattern. Examples of the two-dimensional pattern include, but are not limited to, a polygonal pattern, a circular pattern, an elliptical pattern, and a freeform pattern.

It will be appreciated that "infrared emitters" are used in the projection apparatus as the infrared light emitted therefrom can be used in bright as well as dark real-world environments. Moreover, the infrared light is invisible to a human eye. Therefore, when the second pattern of light spots is projected onto the objects present in the real-world environment, no visual disturbance is caused to people in the real-world environment. Such a projection apparatus that employs the infrared light can be beneficially used for several applications (described later).

Optionally, the infrared emitters of said array comprise vertical-cavity surface-emitting laser diodes. The vertical-cavity surface-emitting laser (VCSEL) diodes emit light perpendicularly from their top surface. The VCSEL diodes are easy to test, easy to manufacture, and are cost effective when manufactured in large quantities.

Additionally or alternatively, optionally, the infrared emitters of said array comprise infrared light-emitting devices. Examples of the infrared light-emitting devices include, but are not limited to, infrared light-emitting diodes, infrared lamps, and infrared lasers. As an example, the infrared emitters of the array may comprise edge-emitting semiconductor lasers.

Throughout the present disclosure, the term "liquid-crystal cell" refers to a device that is electrically controllable to guide an optical path of light incident thereupon. Notably, a given liquid-crystal cell is selectively controllable to block the light, transmit the light in an unbended manner, or bend the light. The given liquid-crystal cell is associated with a corresponding control circuit, wherein the control circuit is configured to control the given liquid-crystal cell by adjusting a voltage applied to the given liquid-crystal cell.

The given liquid-crystal is arranged in front of its corresponding infrared emitter of the array. When the infrared emitters of said array comprise VCSEL diodes, the given liquid-crystal is arranged on top of its corresponding infrared emitter. It will be appreciated that the arrangement of the given liquid-crystal with respect to its corresponding infrared emitter is such that light emanating from said infrared emitter is incident upon the given liquid-crystal cell. Then, the given liquid-crystal cell is electrically controlled (by its corresponding control circuit) to guide (namely, adjust) an optical path of the light, as required.

Throughout the present disclosure, the term "processor" refers to hardware, software, firmware or a combination of these. The processor could be implemented as a controller, microcontroller or any other processing module. The processor controls overall operation of the projection apparatus. In particular, the processor is coupled to the control circuits corresponding to the plurality of liquid-crystal cells and is configured to control an operation of the control circuits. It will be appreciated that the processor is coupled to various components of the display apparatus and optionally, controls operation of at least some of said components.

Optionally, the processor is coupled to the array of infrared emitters, wherein the processor is configured to control an operation of said array. Alternatively, optionally, the array of infrared emitters is not controlled by the processor, wherein the processor is configured to control the operation of the aforesaid control circuits such that the plurality of liquid-crystal cells operate in sync with emission of light from the infrared emitters.

The drive signals for driving the control circuits in the random or pseudorandom manner are generated by the processor. The generation of the drive signals is performed repeatedly over a period of time, when the projection apparatus is in operation. When the drive signals are generated in the random or pseudorandom manner, the control circuits are driven to control their corresponding liquid-crystal cells in the random or pseudorandom manner. Therefore, the second pattern of light spots is projected in the random or pseudorandom manner.

Optionally, when generating the drive signals, the processor is configured to determine a random or pseudorandom pattern of light spots that is to be projected onto the objects present in the real-world environment and to generate the drive signals according to the random or pseudorandom pattern.

In one embodiment, the drive signals for driving the control circuits are generated in the random or pseudorandom manner, thereby causing the second pattern of light spots to be projected in the random or pseudorandom manner. In another embodiment, the random or pseudorandom second pattern to be projected is determined, and then the drive signals for driving the control circuits are generated in the random or pseudorandom manner.

The plurality of liquid-crystal cells are selectively and individually controlled to guide the optical path of the light emanating from their corresponding infrared emitters. When driven by a given drive signal, a given control circuit electrically controls a corresponding liquid-crystal cell to control light emanating from a corresponding infrared emitter in one of the following three ways:

In a first way, a given liquid-crystal cell blocks light emanating from its corresponding infrared emitter. In this way, the light is unable to pass through the given liquid-crystal cell and is not incident upon the real-world environment (notably, said light does not form a light spot in the second pattern).

In a second way, a given liquid-crystal cell transmits light emanating from its corresponding infrared emitter in an unbended manner. In this way, the light passes through the given liquid-crystal cell without any change in its optical path, and is incident upon the real-world environment (notably, said light forms a light spot in the second pattern).

In a third way, a given liquid-crystal cell bends light emanating from its corresponding infrared emitter. In this way, the light passes through the given liquid-crystal cell whilst undergoing a change in its optical path, and is incident upon the real-world environment (notably, said light forms a light spot in the second pattern). The change in the optical path of the light is defined by at least one of: a change in a direction of propagation of the light, a deflection angle of the light.

It will be appreciated that the given control circuit controls its corresponding liquid-crystal cell by controlling an electric field around said liquid-crystal cell. The electric field controls an arrangement of liquid-crystal molecules within the liquid-crystal cell, wherein the arrangement of the liquid-crystal molecules affects a manner in which the optical path of light is controlled (namely, guided) by said liquid-crystal cell. In other words, the electric field controls a wavefront of the light.

Optionally, when generating the drive signals, the processor is configured to divide the plurality of liquid-crystal cells into a first subset of liquid-crystal cells and a second subset of liquid-crystal cells, wherein, when controlling the plurality of liquid-crystal cells, the processor is configured to control the first subset of liquid-crystal cells to block light emanating from corresponding infrared emitters, whilst controlling the second subset of liquid-crystal cells to transmit light emanating from corresponding infrared emitters in an unbended manner.

Optionally, in this regard, an arrangement of light spots within the second pattern depends upon the division of the plurality of liquid-crystal cells into the first subset of liquid-crystal cells and the second subset of liquid-crystal cells. As the liquid-crystal cells of the first subset and the second subset guide optical paths of light differently, the arrangement of light spots within the second pattern directly corresponds to a manner in which the plurality of liquid-crystal cells are divided into the first subset and the second subset. In this case, the second pattern of light spots comprises light spots formed by the light emanating from the infrared emitters corresponding to the second subset of liquid-crystal cells only. The light emanating from the infrared emitters corresponding to the first subset of liquid-crystal cells is effectively blocked by said liquid-crystal cells, and does not form any light spots in the second pattern.

Optionally, the division of the plurality of liquid-crystal cells into the first subset of liquid-crystal cells and the second subset of liquid-crystal cells is dynamically adjustable. In such a case, the division could be changed whilst the projection apparatus is in use as required.

In an embodiment, when the division of the plurality of liquid-crystal cells into the first subset and the second subset is dynamically adjustable, said division is performed in a random or pseudorandom manner. As an example, the division of the plurality of liquid-crystal cells into the first subset and the second subset could be changed on a frame-to-frame basis. For example, the projection apparatus may comprise 1000 liquid-crystal cells that are divided dynamically as: 400 liquid-crystal cells in the first subset and 600 liquid-crystal cells in the second subset for a first frame, 250 liquid-crystal cells in the first subset and 750 liquid-crystal cells in the second subset for a second frame, 800 liquid-crystal cells in the first subset and 200 liquid-crystal cells in the second subset for a third frame, 500 liquid-crystal cells in the first subset and 500 liquid-crystal cells in the second subset for a fourth frame, and so on.

In another embodiment, when the division of the plurality of liquid-crystal cells into the first subset and the second subset is dynamically adjustable, said division is performed in a predetermined manner.

Optionally, when controlling the plurality of liquid-crystal cells, the processor is configured to adjust electrical voltages of at least a subset of the plurality of liquid-crystal cells individually to bend light emanating from corresponding infrared emitters at different deflection angles. Optionally, a given deflection angle lies in a range of 1 degree to 45 degrees. For example, the given deflection angle may be from 1, 5, 10, 15, 20, 25, 30, 35 or 40 degrees up to 5, 10, 15, 20, 25, 30, 35, 40 or 45 degrees. Herein, by "at least a subset of the plurality of liquid-crystal cells", it is meant that at least some of the plurality of liquid-crystal cells are controlled individually to bend the light emanating from corresponding infrared emitters at the different deflection angles. When the light emanating from the infrared emitters corresponding to at least the subset of the plurality of liquid-crystal cells is bent at different deflection angles, an uncorrelated (namely, a random or pseudorandom) second pattern of light spots is projected onto the objects present in the real-world environment.

In an embodiment, the processor is configured to adjust electrical voltages of each of the plurality of liquid-crystal cells individually to bend light emanating from corresponding infrared emitters at different deflection angles. In such a case, an entirety of (namely, all) the liquid-crystal cells amongst the plurality of liquid-crystal cells are controlled individually to bend light emanating from corresponding infrared emitters at different deflection angles.

In another embodiment, the processor is configured to divide the plurality of liquid-crystal cells into a third subset of liquid-crystal cells and a fourth subset of liquid-crystal cells, wherein when controlling the plurality of liquid-crystal cells, the processor is configured to adjust electrical voltages of the third subset of the plurality of liquid-crystal cells individually to bend light emanating from corresponding infrared emitters at different deflection angles, whilst controlling the fourth subset of the plurality of liquid-crystal cells to transmit light emanating from corresponding infrared emitters in an unbended manner.

In yet another embodiment, the processor is configured to divide the plurality of liquid-crystal cells into a fifth subset of liquid-crystal cells, a sixth subset of liquid-crystal cells and a seventh subset of liquid-crystal cells, wherein when controlling the plurality of liquid-crystal cells, the processor is configured to control the fifth subset of the plurality of liquid-crystal cells to block light emanating from corresponding infrared emitters, and to control the sixth subset of the plurality of liquid-crystal cells to transmit light emanating from corresponding infrared emitters in an unbended manner, whilst adjusting electrical voltages of the seventh subset of the plurality of liquid-crystal cells to bend light emanating from corresponding infrared emitters at different deflection angles.

In an embodiment, the first pattern is a spatially uniform pattern, and the second pattern is a spatially non-uniform pattern. Throughout the present disclosure, the term "spatially uniform pattern" refers to a pattern having a uniform spatial density of elements across the pattern, whereas the term "spatially non-uniform pattern" refers to a pattern having a non-uniform (namely, variable) spatial density of elements across the pattern. When the first pattern is the spatially uniform pattern, a density of the infrared emitters is uniform spatially across the array. As a result, the infrared emitters of the array emit a spatially uniform pattern (namely, a regular pattern) of light. When the second pattern is the spatially non-uniform pattern, a density of the light spots varies spatially across the pattern. Therefore, in this embodiment, the spatially uniform pattern of light is converted into the spatially non-uniform pattern of light spots, by individually controlling the plurality of liquid-crystal cells via their corresponding control circuits.

It will be appreciated that as the second pattern is a random or pseudorandom pattern in such an implementation, when the second pattern is a spatially non-uniform pattern, the density of the light spots varies spatially across the second pattern in a random or pseudorandom manner.

In another embodiment, the first pattern is a spatially non-uniform pattern, and the second pattern is a spatially uniform pattern. When the first pattern is the spatially non-uniform pattern, a density of the infrared emitters varies spatially across the array. As a result, the infrared emitters of the array emit a spatially non-uniform pattern (namely, an irregular pattern) of light. When the second pattern is the spatially uniform pattern, a density of the light spots is uniform spatially across the pattern. Therefore, in this embodiment, the spatially non-uniform pattern of light is converted into the spatially uniform pattern of light spots, by individually controlling the plurality of liquid-crystal cells via their corresponding control circuits. It will be appreciated that in such an implementation, the drive signals for driving the control circuits corresponding to the plurality of liquid-crystal cells are generated based on the first pattern.

Optionally, in this regard, the spatially non-uniform pattern is a random or pseudorandom pattern. In other words, the density of the infrared emitters varies spatially across the array in a random or pseudorandom manner.

Optionally, the processor is configured to alter the drive signals to change a density of light spots in the second pattern. When the drive signals are altered, a manner in which the control circuits corresponding to the plurality of liquid-crystal cells are driven is also altered. As a result, a manner in which the plurality of liquid-crystal cells are controlled to guide the optical path of light incident thereupon also changes. This leads to alteration (notably, the change in the density of light spots) of the second pattern.

Optionally, in this regard, the density of light spots in the second pattern is changed by any of: blocking light emanating from at least one infrared emitter, transmitting light emanating from at least one infrared emitter in an unbended manner, bending light emanating from at least one infrared emitter. It will be appreciated that the density of light spots in the second pattern can be reduced by blocking light emanating from a larger number of infrared emitters, and vice versa.

In an embodiment, the drive signals are altered in a random or pseudorandom manner. Correspondingly, the density of light spots in the second pattern is changed in a random or pseudorandom manner. In another embodiment, the drive signals are altered in a predetermined manner. Correspondingly, the density of light spots in the second pattern is changed in the predetermined manner, as required.

Optionally, the projection apparatus further comprises a diffractive optical element arranged on an optical path of light emanating from the plurality of liquid-crystal cells. Throughout the present disclosure, the term "diffractive optical element" refers to an optical element that is capable of redistributing light incident thereupon. When the light emanating from the plurality of liquid-crystal cells is incident upon the diffractive optical element, optical properties of the diffractive optical element cause redistribution of the light to produce the second pattern of light spots (that is projected onto the objects present in the real-world environment). It will be appreciated that the diffractive optical element redistributes the light with minimal loss. The diffractive optical element manipulates phase and/or amplitude of the light to produce the second pattern of light spots.

Optionally, the diffractive optical element is implemented as any of: transmissive and reflective surface relief phase gratings of various profiles and structures, two dimensional diffractive structures, volume brag gratings, a diffractive beam splitter, a diffractive beam shaper, a diffractive line generator, a diffractive diffuser. Optionally, in this regard, the various profiles and structures of the transmissive and reflective surface relief phase gratings are any of: triangular grooves, binary lamellar gratings, multi-level lamellar gratings.

Alternatively, optionally, the diffractive optical element is implemented as a sequence of diffractive sub-elements. Optionally, within said sequence, the diffractive sub-elements are arranged according to their optical properties.

Optionally, the projection apparatus further comprises a plurality of collimators, a given collimator being arranged on an optical path between a given infrared emitter and a corresponding liquid-crystal cell. The plurality of collimators focus (namely, collimate) light emanating from corresponding infrared emitters as the light travels from the array towards the plurality of liquid-crystal cells. In particular, the plurality of collimators minimize spreading of the light emanating from the infrared emitters of the array.

Optionally, the plurality of collimators are implemented as perforated plates. Alternatively, optionally, the plurality of collimators are implemented as a lenticular array. Yet alternatively, optionally, the plurality of collimator are implemented as an array of nanotubes, wherein each nanotube of the array collimates light emanating from a single infrared emitter of the array.

The present disclosure also relates to the imaging system as described above. Various embodiments and variants disclosed above, with respect to the aforementioned first aspect, apply mutatis mutandis to the imaging system.

Throughout the present disclosure, the term "imaging system" refers to specialized equipment for capturing images of the real-world environment. The captures images are processed to gather specific information about the real-world environment, which is then used to generate extended-reality images for a display apparatus. The extended-reality images are to be presented to a user of the display apparatus.

Throughout the present disclosure, the term "extended-reality" encompasses virtual reality, augmented reality, mixed reality, and the like.

Optionally, the imaging system is integrated into the display apparatus. Herein, the term "display apparatus" refers to specialized equipment that is configured to present the extended-reality environment to the user when the display apparatus in operation is worn by the user on his/her head. In such an instance, the display apparatus acts as a device (for example, such as an extended-reality headset, a pair of extended-reality glasses, and the like) that is operable to present a visual scene of the extended-reality environment to the user. Commonly, the "display apparatus" is referred to as "head-mounted display apparatus", for the sake of convenience only.

Throughout the present disclosure, the term "camera" refers to equipment that is operable to detect and process reflections of the light spots from the surfaces of the objects present in the real-world environment, so as to capture the image of such reflections. It will be appreciated that said image of the reflections of the light spots may be captured from a perspective of the projection apparatus and/or from at least one other perspective.

Optionally, the at least one camera comprises a camera chip, wherein the reflections of the light spots are directed by optical element(s) of the camera and/or optical element(s) of the imaging system onto a photosensitive surface of the camera chip, thereby enabling the at least one camera to capture the image of said reflections.

It will be appreciated that the term "at least one camera" relates to "one camera" in some implementations, and "a plurality of cameras" in other implementations. More details of such implementations have been elucidated later.

Optionally, the at least one camera is at least one of: a digital camera, a RGB-D camera, a Light Detection and Ranging (LiDAR) camera, a Time-of-Flight (ToF) camera, a laser rangefinder, a stereo camera, a dual pass-through camera. Herein, the term "dual pass-through camera" refers to a camera that is used to capture an image of a real-world environment along with depth information pertaining to the real-world environment.

Moreover, optionally, the at least one camera is implemented as at least one of: an infrared camera, a hyperspectral camera.

The captured image represents the objects in the real-world environment and how the light spots of the second pattern are reflected from the surfaces of the objects.

The captured image is processed to gather information pertaining to at least one of: an optical depth of a given object, a texture of a given surface of the given object, a shape of the given surface, a material of the given surface. Notably, a manner in which light spots of the second pattern are reflected from the surfaces of the objects present in the real-world environment allows for gathering said information.

Throughout the present disclosure, the term "optical depth" of a given object refers to an optical distance of the given object from the at least one camera. The gathered information is used to generate the extended-reality images for the display apparatus.

Optionally, when the imaging system comprises a single camera for capturing the image of the reflections of light spots, the captured image is compared with a reference image of the second pattern of light spots to calculate the optical distance between points in the captured image and the imaging system (and specifically, said camera). In such a case, the captured image and the reference image are compared to determine a local transverse shift of the light spots of the second pattern, and the local transverse shift is used to calculate the optical depth of the given object.

Alternatively, optionally, when the imaging system comprises the plurality of cameras (namely, two or more cameras) for capturing a plurality of images of the reflections of light spots, the captured plurality of images are processed via a triangulation technique to calculate the optical distance between points in the captured images and the imaging system (and specifically, the plurality of cameras). The optical distance of points corresponding to the given object is the optical depth of the given object.

Optionally, the triangulation technique is based on implementing block matching between plurality of images of the reflections of light spots. In block matching, disparity at a given point in the real-world environment is estimated by comparing congruent blocks representative of the given point and a region surrounding the given point in the plurality of images. Said comparison may be performed using metrics such as Normalized Cross Correlation (NCC), Sum of absolute differences (SAD), Sum of Squared Differences (SSD), Rank-based metrics (for example, such as rank transform, census transform), and the like.

Optionally, the captured image is processed via at least one image processing algorithm to identify a nature of the reflections of light spots from the given surface of the given object, wherein the nature of the reflections is indicative of the texture of the given surface of the given object. In this regard, the nature of the reflections is at least one of: specular reflections, diffuse reflections. Herein, diffuse reflections encompass coherent scattering, as well as incoherent scattering. As an example, the diffuse reflections may be Lambert scattering wherein reflections appear equally bright from many directions. Specular reflections of the light spots from the given surface of the given object is indicative of a smooth texture of the given surface, whereas diffuse reflections of the light spots from the given surface of the given object is indicative of a rough texture of the given surface. It will be appreciated that a given object has at least one surface having a smooth texture, a rough texture, or a combination of these. In an example, specular reflections of the light spots occur from the given surface of the given object (for example, such as a steel almirah). When the captured image is processed to identify occurrence of the specular reflections, the gathered information pertaining to a texture of the given surface of the given object may indicate that the given surface has a smooth texture.

Optionally, the captured image is processed via at least one image processing algorithm to determine the shape of the given surface of the given object. Optionally, in this regard, distortions of the reflections of the light spots across the given surface are indicative of the shape of the given surface. An extent of distortion of a given reflection of a given light spot is indicative of curvature of a point on the given surface from which the given light spot is reflected.

The given surface may be flat, curved, or a combination of flat and curved. In an example, when the reflections of the light spots across the given surface have minimal or nil distortions, the shape of the given surface may be determined to be flat. In another example, when the reflections of the light spots across the given surface have substantial distortions, the shape of the given surface may be determined to be curved.

Optionally, the at least one image processing algorithm for processing the captured image is at least one blob detection algorithm. In such a case, parameters such as radius of a blob (namely, a reflection of a light spot in the second pattern), intensity of the blob, ratio of intensities of a center and an edge of the blob, and the like are used to determine shapes and textures of objects in the real-world environment. Examples of the at least one blob detection algorithm include, but are not limited to, Laplacian of Gaussian (LoG), Difference of Gaussians (DoG), and Determinant of Hessian (DoH).

Optionally, the captured image is processed via at least one neural network to identify the material of the given surface. Optionally, in this regard, the at least one neural network is trained, prior to processing the captured image, using at least one deep learning algorithm, wherein the at least one deep learning algorithm employs at least one material database for training the at least one neural network. It will be appreciated that material databases having large datasets (for example, datasets comprising few hundred thousand material samples) and/or a large number of samples pertaining to relatively-uncommon materials allow for improving an accuracy with which the material of the given surface is identified.

Optionally, when the at least one camera is implemented as at least one hyperspectral camera, the captured image is a hyperspectral image. Optionally, in this regard, the hyperspectral image is processed to generate a spectral response of the given surface, and the spectral response is analyzed to identify the material of the given surface. The spectral response of the given surface indicates a variation in absorption or reflectance characteristics of the material of the given surface with respect to various wavelengths. Spectral responses for different materials are different, and can therefore be used to accurately identify the material of the given surface.

It will be appreciated that the given object could be composed of a single material, as well as a plurality of materials. In an example, the given object may be a cube having six surfaces, wherein each surface is made of a plastic material. In another example, the given object may be a showpiece having 11 surfaces, wherein five surfaces are made of a glass material and six surfaces are made of a wood material. In another example, the given object may be a pen-stand having four surfaces, wherein each surface of the pen-stand is made of a different material.

Optionally, in the imaging system, the first pattern is a spatially uniform pattern, wherein the processor is configured to switch between the spatially uniform pattern and a spatially non-uniform pattern to project the second pattern of light spots. In other words, the second pattern of light spots can be dynamically switched to be either the spatially uniform pattern or the spatially non-uniform pattern at a given time, as required. Moreover, optionally, a density of light spots in the second pattern is also dynamically adjustable, as required.

In an embodiment, when it is required to gather information pertaining to an optical depth of a given object whose surface is flat and has a smooth texture, the second pattern is the spatially non-uniform pattern. In such a case, the density of the light spots varies spatially across the second pattern in a random or pseudorandom manner. Such a second pattern of light spots creates a texture over the surface of the given object. Said texture is beneficially utilized when the triangulation technique is employed for determining the optical depth of the given object.

Optionally, in this regard, the processor is further configured to process data pertaining to estimated disparity at a region corresponding to the given object using at least one of: Weighted Least Squares filtering, Fast Global Smoothening, Disparity map filtering based on Weighted Least Squares filtering, left-right-consistency-based confidence. Such further processing enables in refining results (to increase accuracy) of estimated disparity in partially-occluded and uniform portions of the given object.

In another embodiment, when it is required to gather information pertaining to an optical depth of a given object whose surface is curved and has a rough texture, the second pattern is the spatially uniform pattern. Optionally, in this regard, a density of light spots in the second pattern is selected according to roughness of the texture.

In yet another embodiment, when it is required to gather information pertaining to an object having a complicated shape, second pattern is the spatially uniform pattern having a high density of light spots.

It will be appreciated that when switching between the spatially uniform pattern and a spatially non-uniform pattern to project the second pattern of light spots, at least one property of the given object for which a required information is to be gathered is considered. For example, a texture of a given surface of the given object is to be considered when implementing said switching to determine the optical depth of the given surface.

Optionally, in the imaging system, when controlling the plurality of liquid-crystal cells, the processor is configured to adjust electrical voltages of at least a subset of the plurality of liquid-crystal cells individually to bend light emanating from corresponding infrared emitters at different deflection angles.

Optionally, in the imaging system, when generating the drive signals, the processor is configured to divide the plurality of liquid-crystal cells into a first subset of liquid-crystal cells and a second subset of liquid-crystal cells, wherein, when controlling the plurality of liquid-crystal cells, the processor is configured to control the first subset of liquid-crystal cells to block light emanating from corresponding infrared emitters, whilst controlling the second subset of liquid-crystal cells to transmit light emanating from corresponding infrared emitters in an unbended manner.

Optionally, in the imaging system, the processor is configured to alter the drive signals to change a density of light spots in the second pattern.

Optionally, the imaging system further comprises a diffractive optical element arranged on an optical path of light emanating from the plurality of liquid-crystal cells.

Optionally, in the imaging system, the infrared emitters of said array comprise vertical-cavity surface-emitting laser diodes.

The present disclosure also relates to the method as described above.

Various embodiments and variants disclosed above, with respect to the aforementioned first and second aspects, apply mutatis mutandis to the method.

Optionally, in the method, the first pattern is a spatially uniform pattern, wherein the method further comprises switching between the spatially uniform pattern and a spatially non-uniform pattern to project the second pattern of light spots.

Optionally, in the method, the step of controlling the plurality of liquid-crystal cells comprises adjusting electrical voltages of at least a subset of the plurality of liquid-crystal cells individually to bend light emanating from corresponding infrared emitters at different deflection angles.

Optionally, in the method, the step of generating the drive signals comprises dividing the plurality of liquid-crystal cells into a first subset of liquid-crystal cells and a second subset of liquid-crystal cells, wherein the step of controlling the plurality of liquid-crystal cells comprises controlling the first subset of liquid-crystal cells to block light emanating from corresponding infrared emitters, whilst controlling the second subset of liquid-crystal cells to transmit light emanating from corresponding infrared emitters in an unbended manner.

Optionally, the method further comprises altering the drive signals to change a density of light spots in the second pattern.

DETAILED DESCRIPTION OF THE DRAWINGS

Referring to FIG. 1, illustrated is a block diagram of an architecture of a projection apparatus 100, in accordance with an embodiment of the present disclosure. The projection apparatus 100 comprises an array 102 of infrared emitters, a plurality of liquid-crystal cells (depicted as liquid-crystal cells 104a and 104b) and corresponding control circuits (depicted as control circuits 106a and 106b), and a processor 108. The infrared emitters of the array 102 are arranged in a first pattern. A given liquid-crystal cell is arranged in front of a corresponding infrared emitter of the array 102. Hereinafter, the plurality of liquid-crystal cells 104a, 104b and so on, are collectively referred to as 104, whereas their corresponding control circuits 106a, 106b and so on, are collectively referred to as 106, for sake of convenience only.

The processor 108 is configured to:
generate drive signals for driving the control circuits 106 in a random or pseudorandom manner; and
control the plurality of liquid-crystal cells 104 individually, via the corresponding control circuits 106, to project a second pattern of light spots onto objects present in a real-world environment, wherein, when driven by a given drive signal, a given control circuit electrically controls a corresponding liquid-crystal cell to any of:
block light emanating from a corresponding infrared emitter,
transmit the light in an unbended manner,
bend the light.

Figure 2:
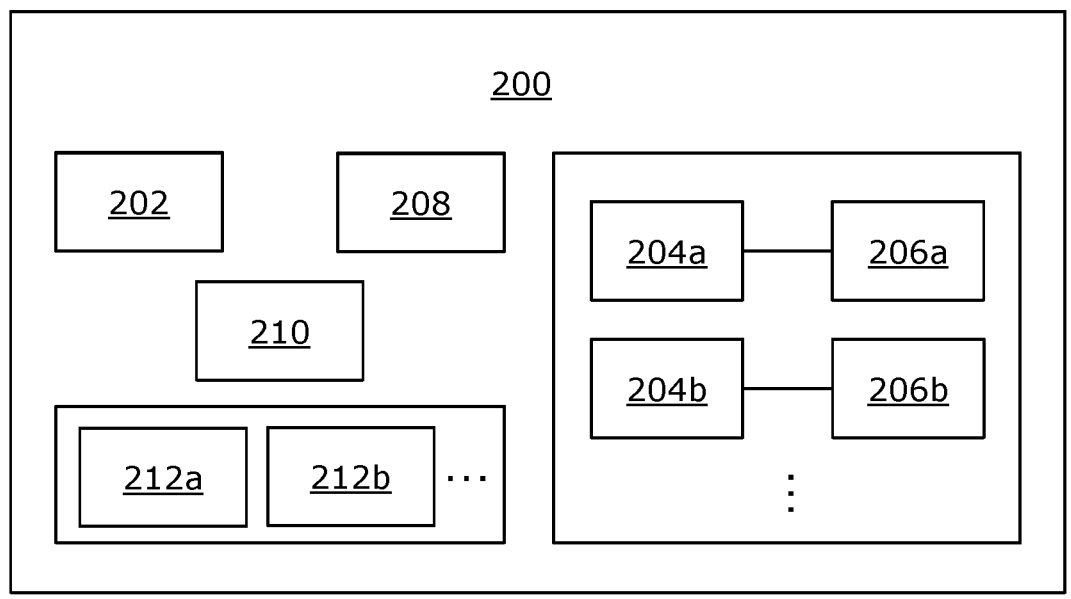

Referring to FIG. 2, illustrated is a block diagram of an architecture of a projection apparatus 200, in accordance with another embodiment of the present disclosure. The projection apparatus 200 comprises an array 202 of infrared emitters, a plurality of liquid-crystal cells (depicted as liquid-crystal cells 204a and 204b) and corresponding control circuits (depicted as control circuits 206a and 206b), and a processor 208. Hereinafter, the plurality of liquid-crystal cells 204a, 204b and so on, are collectively referred to as 204, whereas their corresponding control circuits 206a, 206b and so on, are collectively referred to as 206, for sake of convenience only. The projection apparatus 200 further comprises a diffractive optical element 210 that is arranged on an optical path of light emanating from the plurality of liquid-crystal cells 204. The projection apparatus 200 further comprises a plurality of collimators (depicted as collimators 212a and 212b). A given collimator is arranged on an optical path between a given infrared emitter and a corresponding liquid-crystal cell. The plurality of collimators 212a, 212b and so on, can be collectively referred to as 212, for sake of convenience only.

It may be understood by a person skilled in the art that FIG. 1 and FIG. 2 include simplified architectures of the projection apparatuses 100 and 200, respectively, for sake of clarity, which should not unduly limit the scope of the claims herein. The person skilled in the art will recognize many variations, alternatives, and modifications of embodiments of the present disclosure.

Figure 3:
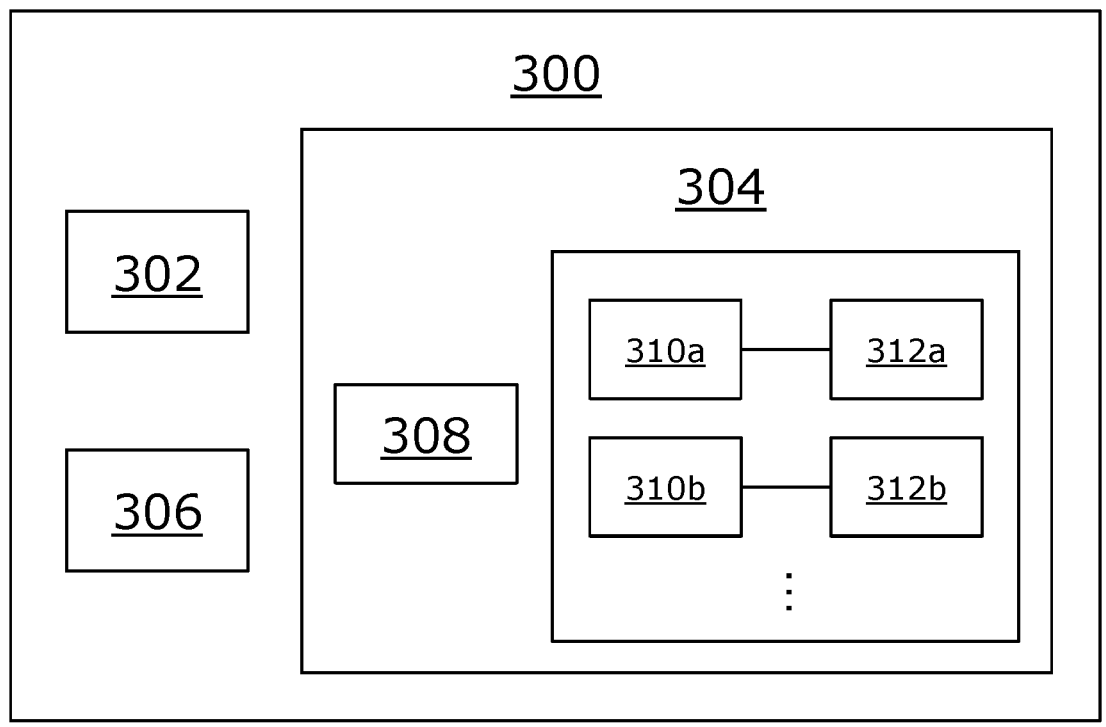
FIG. 3 illustrates a block diagram of an architecture of an imaging system, in accordance with an embodiment of the present disclosure.

Referring to FIG. 3, illustrated is a block diagram of an architecture of an imaging system 300, in accordance with an embodiment of the present disclosure. The imaging system 300 comprises at least one camera (depicted as a camera 302), a projection apparatus 304, and a processor 306. The projection apparatus 304 comprises an array 308 of infrared emitters, and a plurality of liquid-crystal cells (depicted as liquid-crystal cells 310a and 310b) and corresponding control circuits (depicted as control circuits 312a and 312b). Hereinafter, the plurality of liquid-crystal cells 310a, 310b and so on, are collectively referred to as 310, whereas their corresponding control circuits 312a, 312b and so on, are collectively referred to as 312, for sake of convenience only. The infrared emitters of the array 308 are arranged in a first pattern. A given liquid-crystal cell is arranged in front of a corresponding infrared emitter of the array 308.

The processor 306 is configured to:
generate drive signals for driving the control circuits 312 in a random or pseudorandom manner;
control the plurality of liquid-crystal cells 310 individually, via the corresponding control circuits 312, to project a second pattern of light spots onto objects present in a real-world environment, wherein, when driven by a given drive signal, a given control circuit electrically controls a corresponding liquid-crystal cell to any of:
block light emanating from a corresponding infrared emitter,
transmit the light in an unbended manner,
bend the light;
control the camera 302 to capture an image of reflections of the light spots from surfaces of the objects; and
process the captured image to gather information pertaining to at least one of: an optical depth of a given object, a texture of a given surface of the given object, a shape of the given surface, a material of the given surface.

Figure 4:
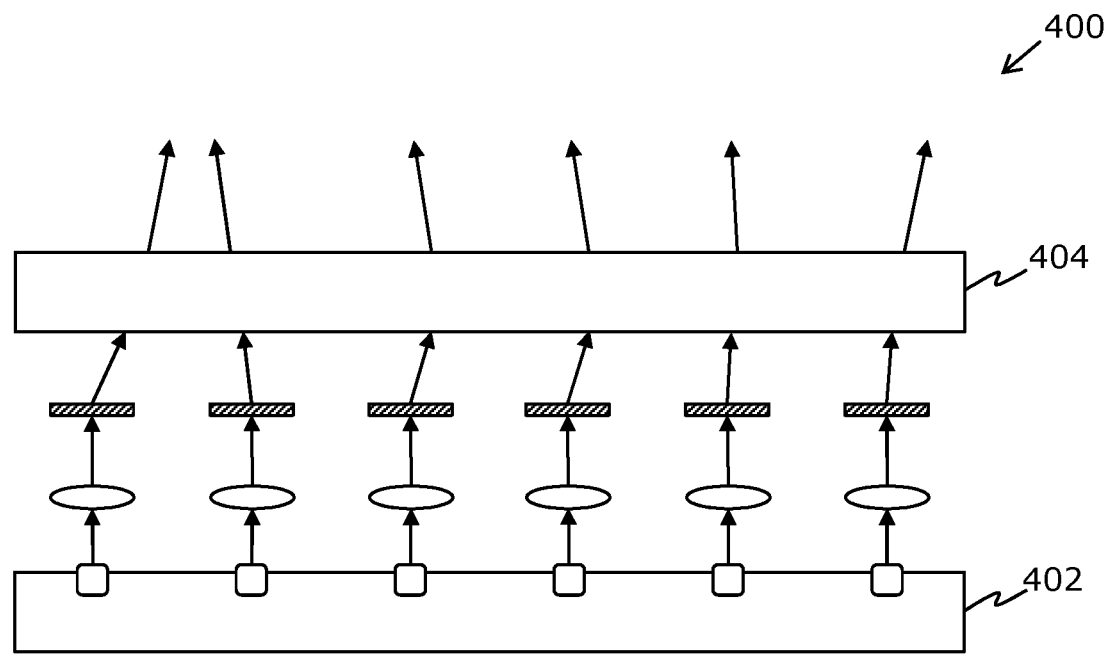
FIG. 4 illustrates how light emanating from an array of infrared emitters travels through a projection apparatus, in accordance with an embodiment of the present disclosure.

Referring to FIG. 4, illustrated is how light emanating from an array 402 of infrared emitters travels through a projection apparatus 400, in accordance with an embodiment of the present disclosure. The array 402 is shown to comprise 6 infrared emitters (depicted as rounded squares on the array 402) which are arranged in a first pattern. Light emitted from the infrared emitters is collimated by a plurality of collimators (depicted as ellipses) as the light travels towards a plurality of liquid-crystal cells (depicted as hatched rectangles). Notably, a given liquid-crystal cell is arranged in front of a corresponding infrared emitter of the array 402. A given collimator is arranged on an optical path between a given infrared emitter and a corresponding liquid-crystal cell. As the light emanates from the plurality of liquid-crystal cells, a diffractive optical element 404 arranged on an optical path of the light diffracts the light to project a second pattern of light spots onto objects present in a real-world environment.

Figure 5A:
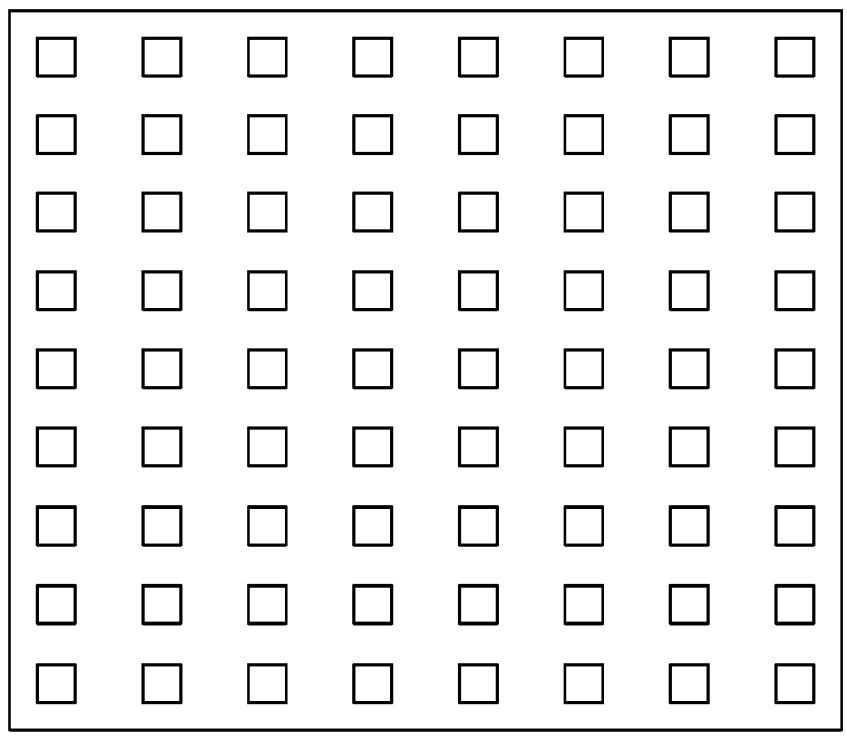
FIGS. 5A, 5B and 5C illustrates how a plurality of liquid-crystal cells are controlled, in accordance with an various embodiments of the present disclosure.
Figure 5B:
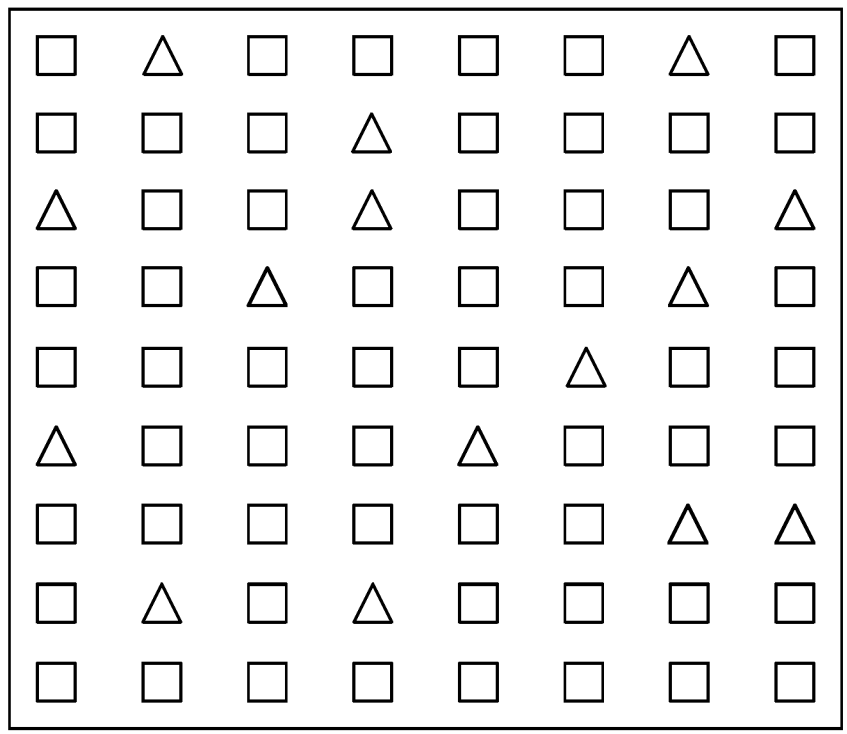
Figure 5C:
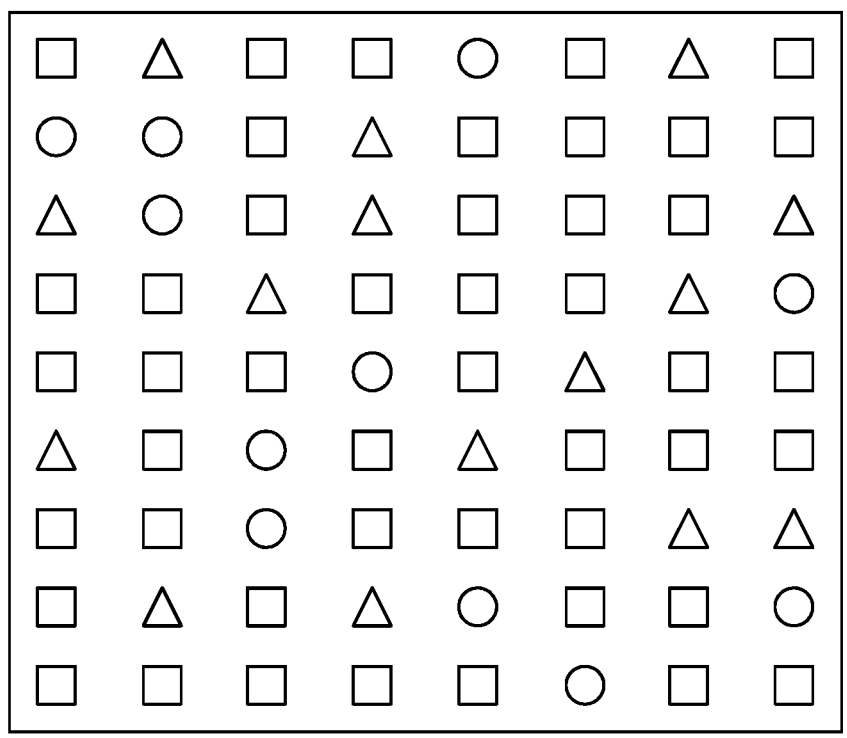
Figure 7A:
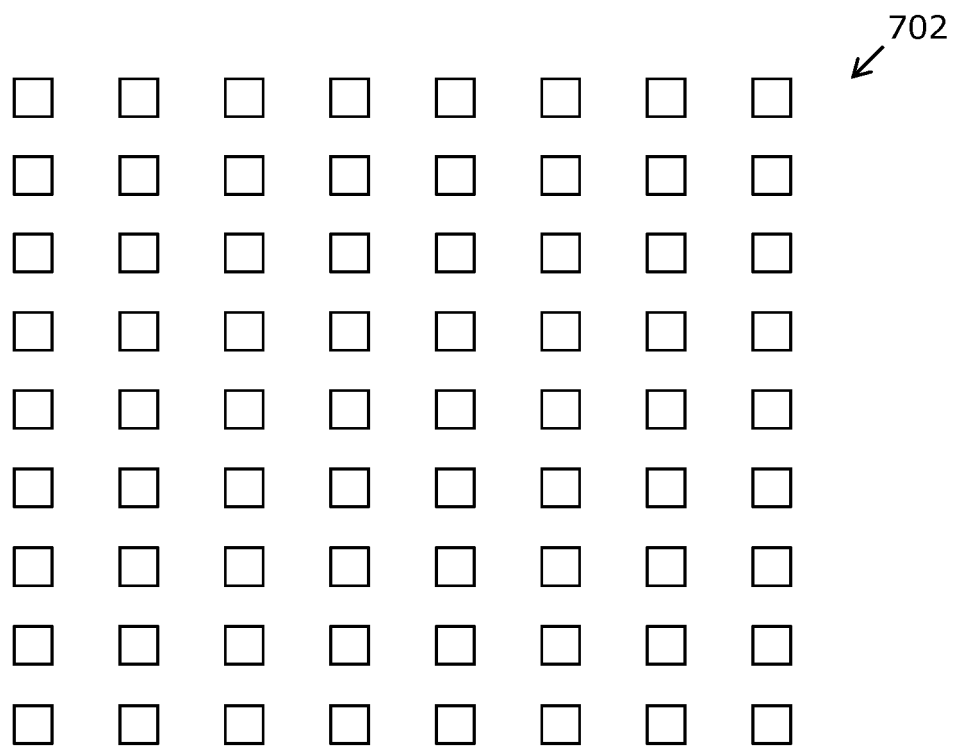
FIG. 7A shows liquid-crystal cells arranged in a first pattern which is a spatially uniform pattern.
Figure 7B:
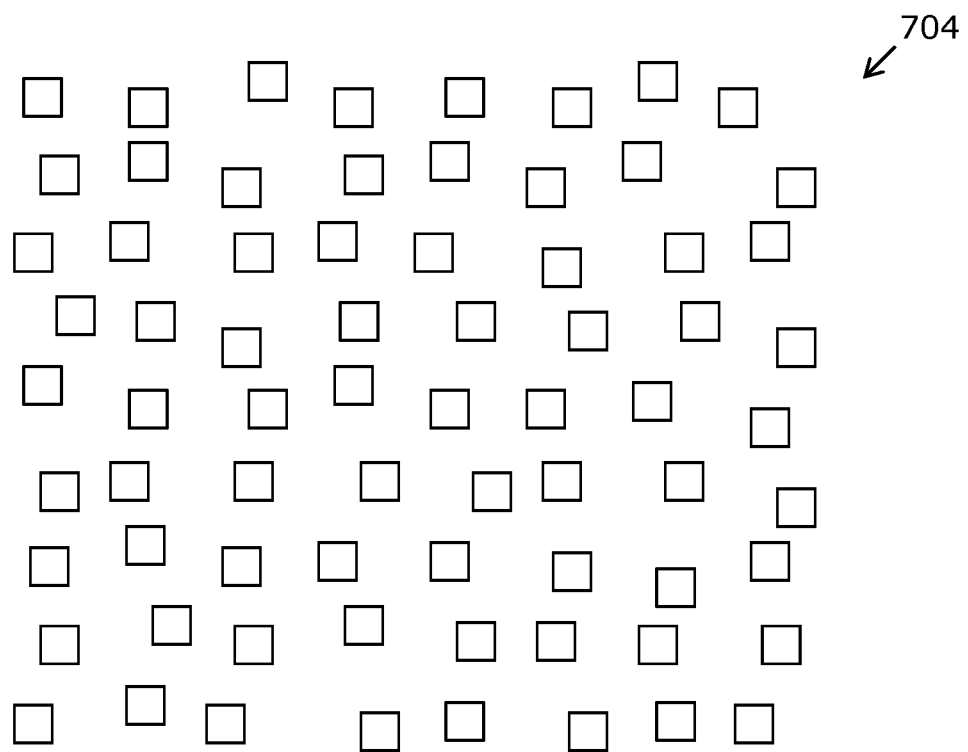
FIGS. 7B and 7C show a second pattern of light spots projected onto objects present in a real-world environment where the second pattern is a spatially non-uniform pattern.
Figure 7C:
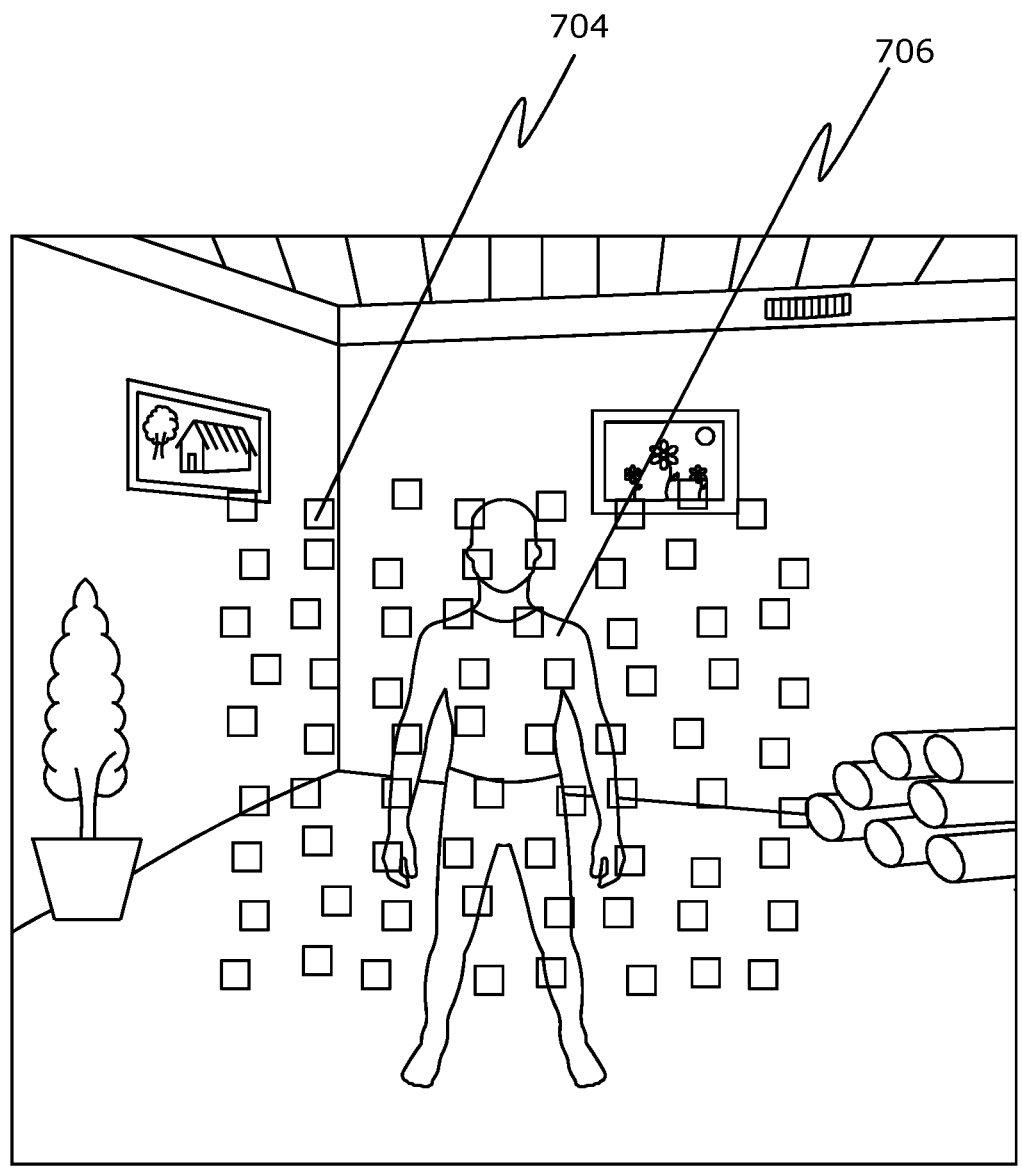

Referring to FIGS. 5A, 5B and 5C, illustrated is how a plurality of liquid-crystal cells are controlled, in accordance with various embodiments of the present disclosure. In FIGS. 5A, 5B and 5C, the plurality of liquid-crystal cells are shown to comprise 72 liquid-crystal cells. These liquid-crystal cells are arranged in a first pattern 702, which is a spatially uniform pattern, as shown in FIG. 7A In FIG. 5A, electrical voltages of an entirety of the plurality of liquid-crystal cells (depicted as squares) are adjusted individually to bend light emanating from corresponding infrared emitters at different deflection angles, thereby projecting a second pattern 704 of light spots onto objects 706 present in a real-world environment as shown in FIGS. 7B and 7C. The second pattern 704 is a spatially non-uniform pattern.

In FIG. 5B, the plurality of liquid-crystal cells are divided into two subsets.

Figure 7D:
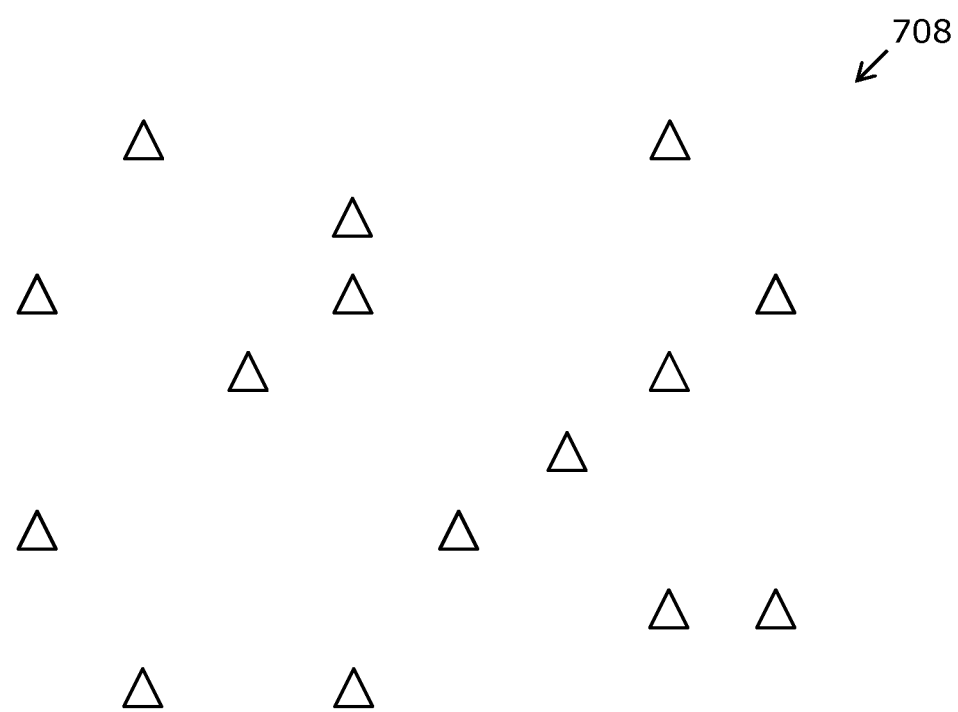
FIG. 7D shows a projected second pattern of light spots where the second pattern is a spatially non-uniform pattern.

In some implementations, the plurality of liquid-crystal cells are divided into a first subset of liquid-crystal cells and a second subset of liquid-crystal cells. Herein, for example, the liquid-crystal cells of the first subset are depicted as squares, whereas the liquid-crystal cells of the second subset are depicted as triangles. In these implementations, the first subset of liquid-crystal cells is controlled to block light emanating from corresponding infrared emitters, whilst the second subset of liquid-crystal cells is controlled to transmit light emanating from corresponding infrared emitters in an unbended manner, thereby projecting a second pattern 708 of light spots as shown in FIG. 7D. The second pattern 708 is a spatially non-uniform pattern.

Figure 7E:
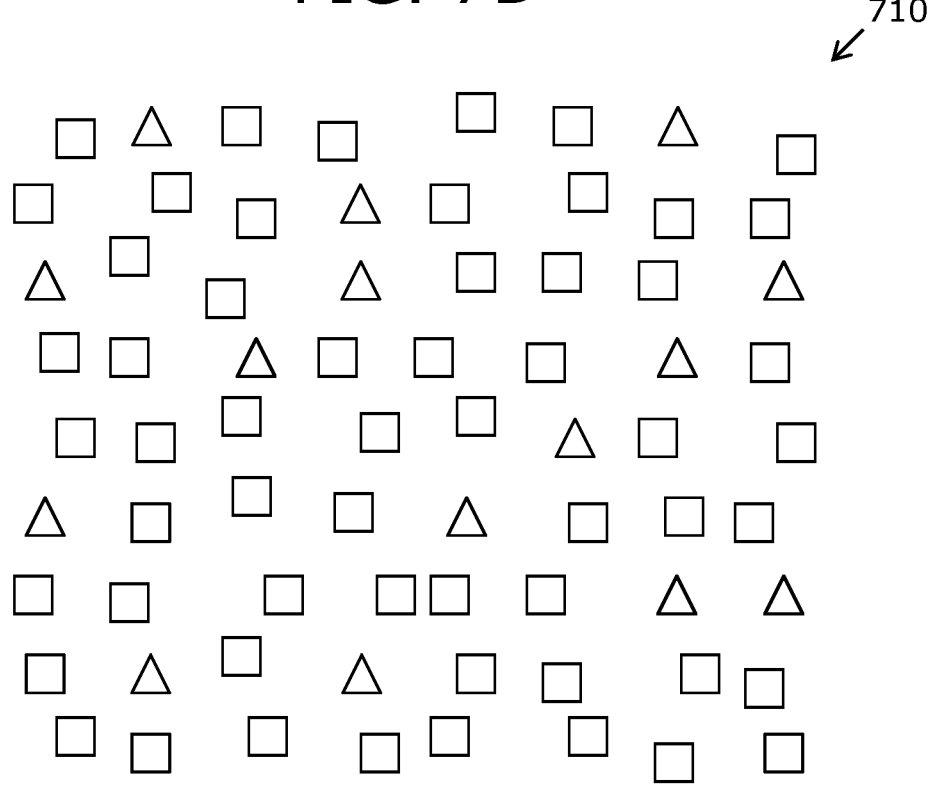
FIG. 7E shows a projected second pattern of light spots where the second pattern is a spatially non-uniform pattern.

In other implementations, the plurality of liquid-crystal cells are divided into a third subset of liquid-crystal cells and a fourth subset of liquid-crystal cells. Herein, for example, the liquid-crystal cells of the third subset are depicted as squares, whereas the liquid-crystal cells of the fourth subset are depicted as triangles. In these implementations, electrical voltages of liquid-crystal cells of the third subset are adjusted individually to bend light emanating from corresponding infrared emitters at different deflection angles, whilst the fourth subset of liquid-crystal cells is controlled to transmit light emanating from corresponding infrared emitters in an unbended manner, thereby projecting a second pattern 710 of light spots as shown in FIG. 7E. The second pattern 710 is a spatially non-uniform pattern.

Figure 7F:
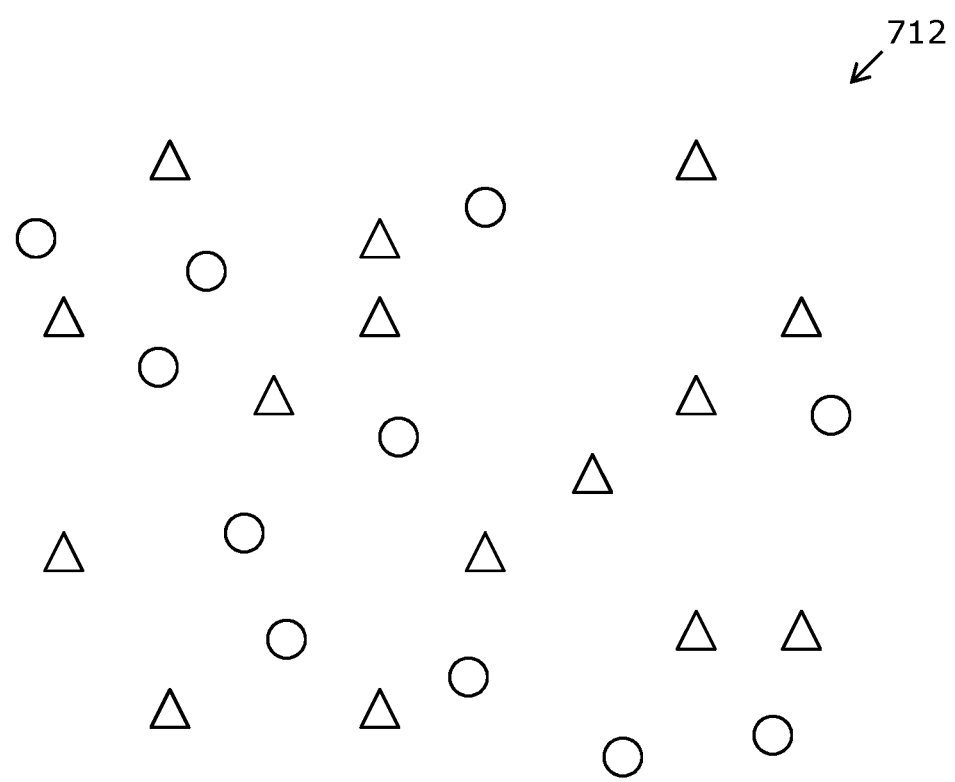
FIG. 7F shows a projected second pattern of light spots where the second pattern is a spatially non-uniform pattern.

In FIG. 5C, the plurality of liquid-crystal cells are divided into three subsets, namely, a fifth subset of liquid-crystal cells, a sixth subset of liquid-crystal cells and a seventh subset of liquid-crystal cells. Herein, the liquid-crystal cells of the fifth subset are depicted as squares, the liquid-crystal cells of the sixth subset are depicted as triangles, whereas the liquid-crystal cells of the seventh subset are depicted as circles. The fifth subset of liquid-crystal cells is controlled to block light emanating from corresponding infrared emitters, the sixth subset of liquid-crystal cells is controlled to transmit light emanating from corresponding infrared emitters in an unbended manner, while the electrical voltages of the seventh subset of the liquid-crystal cells are adjusted individually to bend light emanating from corresponding infrared emitters at different deflection angles, thereby projecting a second pattern 712 of light spots as shown in FIG. 7F. The second pattern 712 is a spatially non-uniform pattern.

Figure 6:
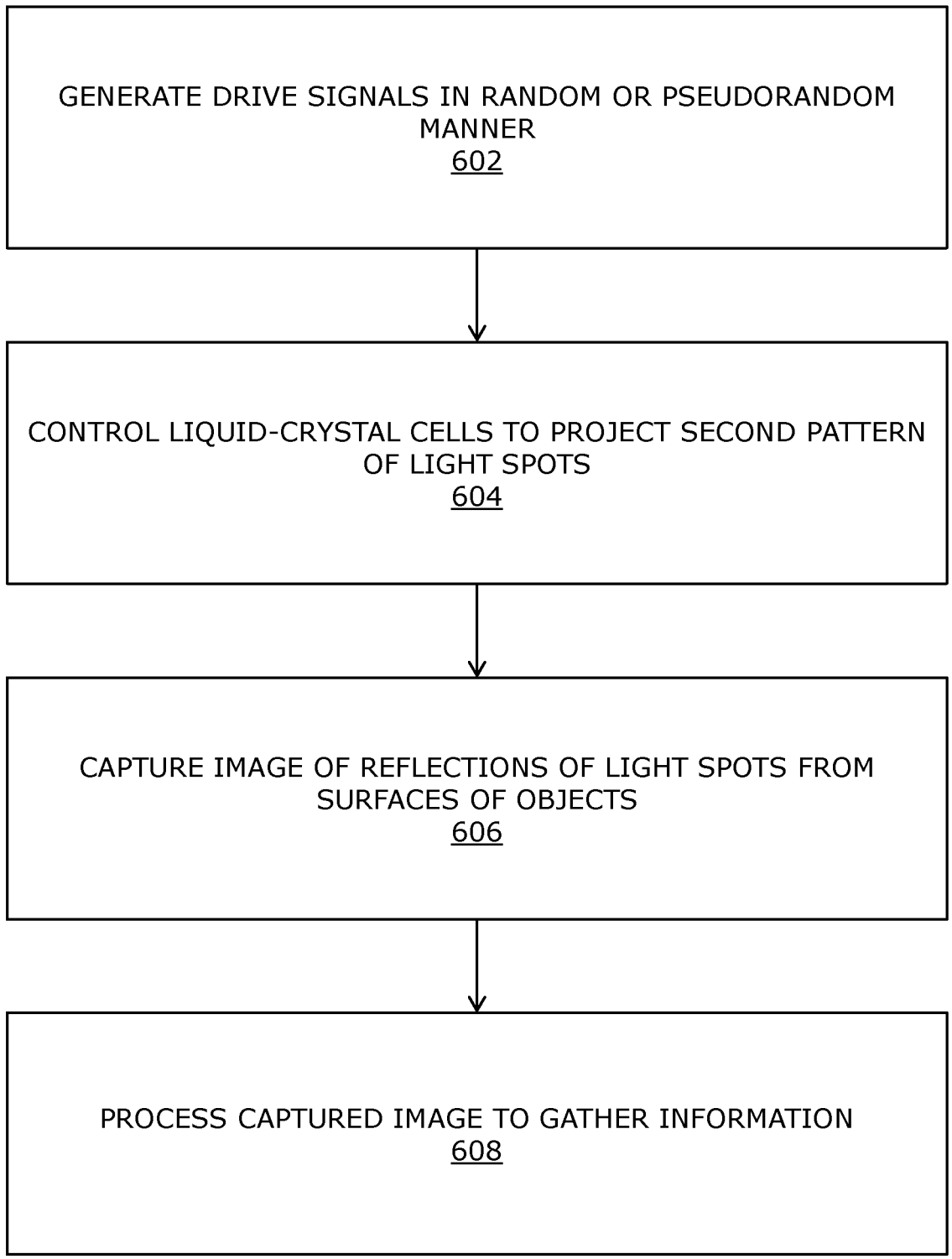
FIG. 6 illustrates steps of a method of imaging, in accordance with an embodiment of the present disclosure.

Referring to FIG. 6, illustrated are steps of a method of imaging, in accordance with an embodiment of the present disclosure. The method of imaging is implemented via an imaging system comprising at least one camera and a projection apparatus comprising an array of infrared emitters arranged in a first pattern, a plurality of liquid-crystal cells and corresponding control circuits, wherein a given liquid-crystal cell is arranged in front of a corresponding infrared emitter of said array. At step 602, drive signals for driving the control circuits in a random or pseudorandom manner are generated. At step 604, the plurality of liquid-crystal cells are controlled individually, via the corresponding control circuits, to project a second pattern of light spots onto objects present in a real-world environment. When driven by a given drive signal, a given control circuit electrically controls a corresponding liquid-crystal cell to any of: block light emanating from a corresponding infrared emitter, transmit the light in an unbended manner, bend the light. At step 606, an image of reflections of the light spots from surfaces of the objects is captured, via the at least one camera. At step 608, the captured image is processed to gather information pertaining to at least one of: an optical depth of a given object, a texture of a given surface of the given object, a shape of the given surface, a material of the given surface.

The steps 602, 604, 606, and 608 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A projection apparatus comprising:
an array of infrared emitters, the infrared emitters of said array being arranged in a first pattern;
a plurality of liquid-crystal cells and corresponding control circuits, a given liquid-crystal cell being arranged in front of a corresponding infrared emitter of said array; and
a processor configured to:
generate drive signals for driving the control circuits in a random or pseudorandom manner; and
control the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
block light emanating from a corresponding infrared emitter,
transmit the light in an unbended manner,
bend the light.

2. The projection apparatus of claim 1, wherein the first pattern is a spatially uniform pattern, and the second pattern is a spatially non-uniform pattern.

3. The projection apparatus of claim 1, wherein the first pattern is a spatially non-uniform pattern, and the second pattern is a spatially uniform pattern.

4. The projection apparatus of claim 1, wherein, when controlling the plurality of liquid-crystal cells, the processor is configured to adjust electrical voltages of at least a subset of the plurality of liquid-crystal cells individually to bend light emanating from corresponding infrared emitters at different deflection angles.

5. The projection apparatus of claim 1, wherein, when generating the drive signals, the processor is configured to divide the plurality of liquid-crystal cells into a first subset of liquid-crystal cells and a second subset of liquid-crystal cells,
wherein, when controlling the plurality of liquid-crystal cells, the processor is configured to control the first subset of liquid-crystal cells to block light emanating from corresponding infrared emitters, whilst controlling the second subset of liquid-crystal cells to transmit light emanating from corresponding infrared emitters in an unbended manner.

6. The projection apparatus of claim 1, wherein the processor is configured to alter the drive signals to change a density of light spots in the second pattern.

7. The projection apparatus of claim 1, further comprising a diffractive optical element arranged on an optical path of light emanating from the plurality of liquid-crystal cells.

8. The projection apparatus of claim 1, wherein the infrared emitters of said array comprise vertical-cavity surface-emitting laser diodes.

9. An imaging system comprising:
at least one camera;
a projection apparatus comprising:
an array of infrared emitters, the infrared emitters of said array being arranged in a first pattern; and
a plurality of liquid-crystal cells and corresponding control circuits, a given liquid-crystal cell being arranged in front of a corresponding infrared emitter of said array; and
a processor configured to:
generate drive signals for driving the control circuits in a random or pseudorandom manner;
control the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
block light emanating from a corresponding infrared emitter,
transmit the light in an unbended manner,
bend the light;
control the at least one camera to capture an image of reflections of the light spots from surfaces of the objects; and
process the captured image to gather information pertaining to at least one of: an optical depth of a given object, a texture of a given surface of the given object, a shape of the given surface, a material of the given surface.

10. The imaging system of claim 9, wherein the first pattern is a spatially uniform pattern, wherein the processor is configured to switch between the spatially uniform pattern and a spatially non-uniform pattern to project the second pattern of light spots.

11. The imaging system of claim 9, wherein, when controlling the plurality of liquid-crystal cells, the processor is configured to adjust electrical voltages of at least a subset of the plurality of liquid-crystal cells individually to bend light emanating from corresponding infrared emitters at different deflection angles.

12. The imaging system of claim 9, wherein, when generating the drive signals, the processor is configured to divide the plurality of liquid-crystal cells into a first subset of liquid-crystal cells and a second subset of liquid-crystal cells,
wherein, when controlling the plurality of liquid-crystal cells, the processor is configured to control the first subset of liquid-crystal cells to block light emanating from corresponding infrared emitters, whilst controlling the second subset of liquid-crystal cells to transmit light emanating from corresponding infrared emitters in an unbended manner.

13. The imaging system of claim 9, wherein the processor is configured to alter the drive signals to change a density of light spots in the second pattern.

14. The imaging system of claim 9, further comprising a diffractive optical element arranged on an optical path of light emanating from the plurality of liquid-crystal cells.

15. The imaging system of claim 9, wherein the infrared emitters of said array comprise vertical-cavity surface-emitting laser diodes.

16. A method of imaging, via an imaging system comprising at least one camera and a projection apparatus comprising an array of infrared emitters arranged in a first pattern, a plurality of liquid-crystal cells and corresponding control circuits, wherein a given liquid-crystal cell is arranged in front of a corresponding infrared emitter of said array, the method comprising:
generating drive signals for driving the control circuits in a random or pseudorandom manner;
controlling the plurality of liquid-crystal cells individually, via the corresponding control circuits, to project a second pattern of light spots onto objects present in a real-world environment, wherein, when driven by a given drive signal, a given control circuit electrically controls a corresponding liquid-crystal cell to any of:
block light emanating from a corresponding infrared emitter,
transmit the light in an unbended manner,
bend the light;
capturing, via the at least one camera, an image of reflections of the light spots from surfaces of the objects; and
processing the captured image to gather information pertaining to at least one of: an optical depth of a given object, a texture of a given surface of the given object, a shape of the given surface, a material of the given surface.

17. The method of claim 16, wherein the first pattern is a spatially uniform pattern, wherein the method further comprises switching between the spatially uniform pattern and a spatially non-uniform pattern to project the second pattern of light spots.

18. The method of claim 16, wherein the step of controlling the plurality of liquid-crystal cells comprises adjusting electrical voltages of at least a subset of the plurality of liquid-crystal cells individually to bend light emanating from corresponding infrared emitters at different deflection angles.

19. The method of claim 16, wherein the step of generating the drive signals comprises dividing the plurality of liquid-crystal cells into a first subset of liquid-crystal cells and a second subset of liquid-crystal cells,
wherein the step of controlling the plurality of liquid-crystal cells comprises controlling the first subset of liquid-crystal cells to block light emanating from corresponding infrared emitters, whilst controlling the second subset of liquid-crystal cells to transmit light emanating from corresponding infrared emitters in an unbended manner.

20. The method of claim 16, further comprising altering the drive signals to change a density of light spots in the second pattern.

* * * * *